US006209448B1

United States Patent
Hagen

(10) Patent No.: US 6,209,448 B1
(45) Date of Patent: Apr. 3, 2001

(54) NUT CRACKING MACHINE

(76) Inventor: William G. Hagen, 7 Cardinal Pl., Golden Eagle, IL (US) 62036-9715

( * ) Notice: Subject to any disclaimer, the term of this patent is extended or adjusted under 35 U.S.C. 154(b) by 0 days.

(21) Appl. No.: 09/511,680

(22) Filed: Feb. 23, 2000

(51) Int. Cl.[7] .................................................. A23N 5/00
(52) U.S. Cl. ............................. 99/575; 99/568; 99/574; 99/579; 99/580; 99/581; 99/617
(58) Field of Search ............................. 99/568, 571–582, 99/617–622; 426/481–485; D7/680

(56) References Cited

U.S. PATENT DOCUMENTS

| D. 267,301 | * | 12/1982 | Hunt | D7/680 |
|---|---|---|---|---|
| 1,342,692 | * | 6/1920 | Pape | 99/575 |
| 2,144,841 | * | 1/1939 | Glaser | 99/579 X |
| 2,316,025 | * | 4/1943 | Smith | 99/574 X |
| 2,321,795 | * | 6/1943 | Buckman | 99/575 |
| 2,549,881 | * | 4/1951 | Berg et al. | 99/579 X |
| 3,628,580 | * | 12/1971 | Langston | 99/578 |
| 3,662,799 | * | 5/1972 | Shaw | 99/574 |
| 4,073,032 | | 2/1978 | Packwood . | |
| 4,201,126 | * | 5/1980 | Evans | 99/579 |
| 4,218,968 | * | 8/1980 | Livingston | 99/617 X |
| 4,441,414 | | 4/1984 | Quantz . | |
| 4,526,092 | * | 7/1985 | Greenblatt et al. | 99/575 |
| 4,793,248 | * | 12/1988 | Frederikson et al. | 99/575 X |
| 5,115,733 | | 5/1992 | Frederiksen et al. . | |
| 5,247,879 | | 9/1993 | Frederiksen et al. . | |
| 5,505,123 | | 4/1996 | Kim . | |
| 6,098,530 | * | 8/2000 | Hemry | 99/575 |

* cited by examiner

Primary Examiner—Timothy F. Simone
(74) Attorney, Agent, or Firm—Polster, Lieder, Woodruff & Lucchesi, L.C.

(57) ABSTRACT

A nut cracking machine comprises a cylinder mounted in bearings for rotation about a long axis of the cylinder. The cylinder has projections extending radially from its cylindrical surface. An anvil plate is held at a fixed predetermined distance from the cylinder when the machine is in operation. The cylinder is power driven. A feed hopper is provided for receiving nuts and directing the nuts onto the cylinder, the cylinder rotating in a direction to direct an upper part of the cylinder toward the anvil plate member, toward an increasingly restricted space between the cylinder and the anvil plate.

16 Claims, 5 Drawing Sheets

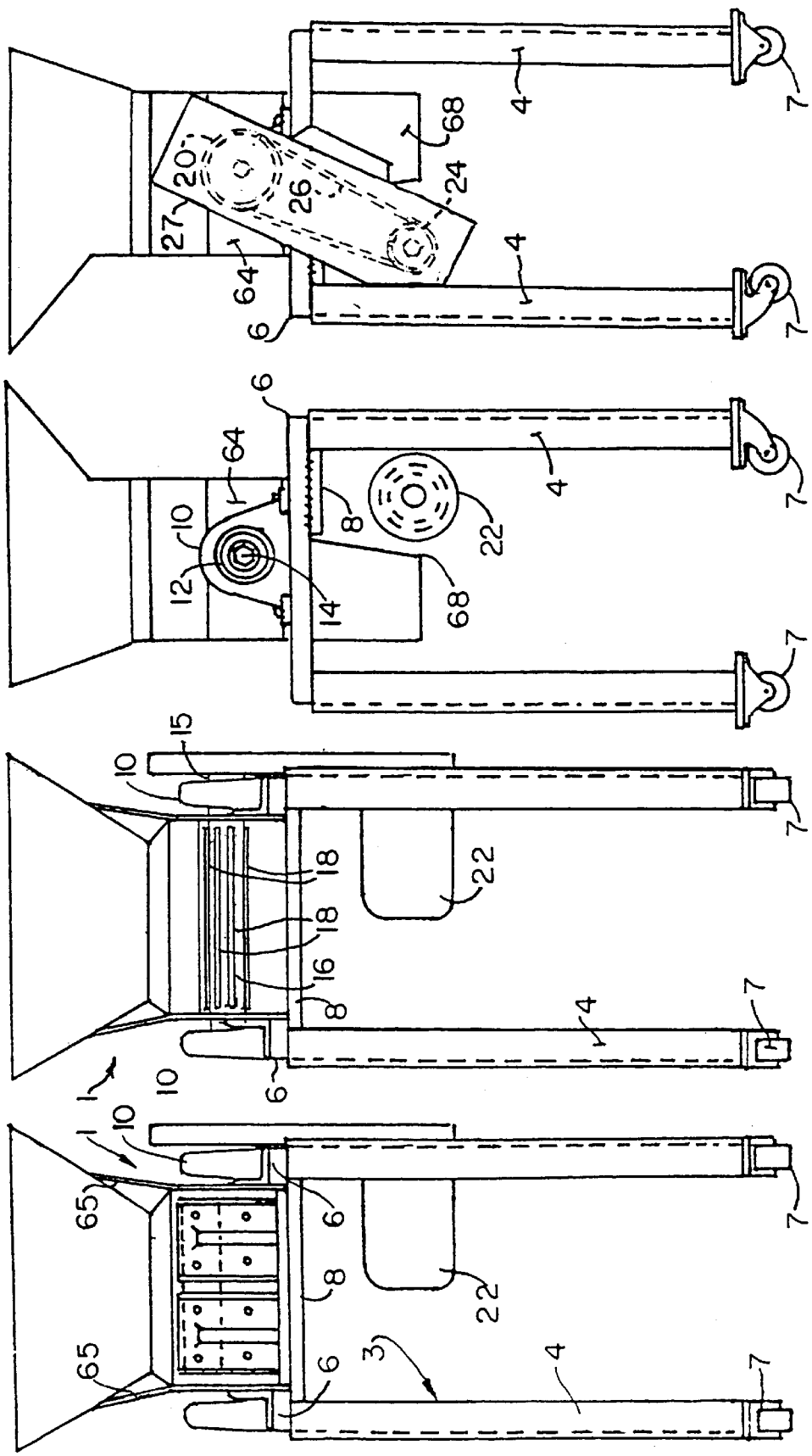

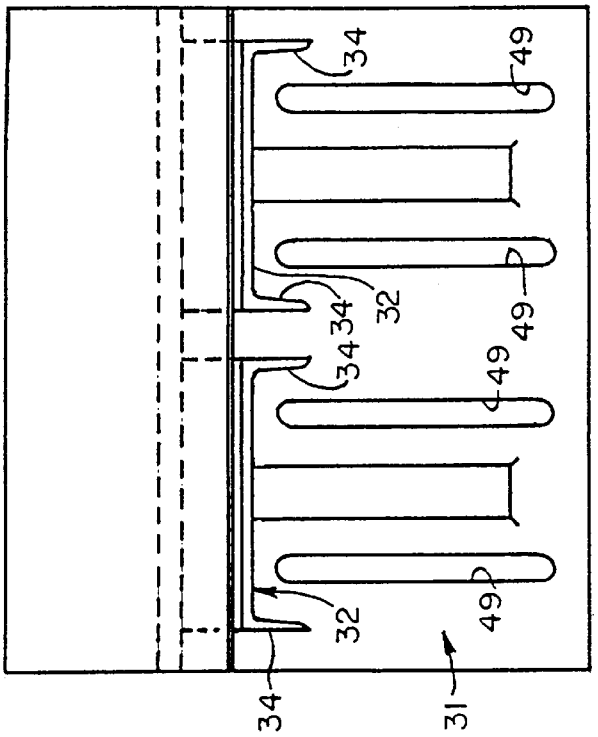
FIG.5
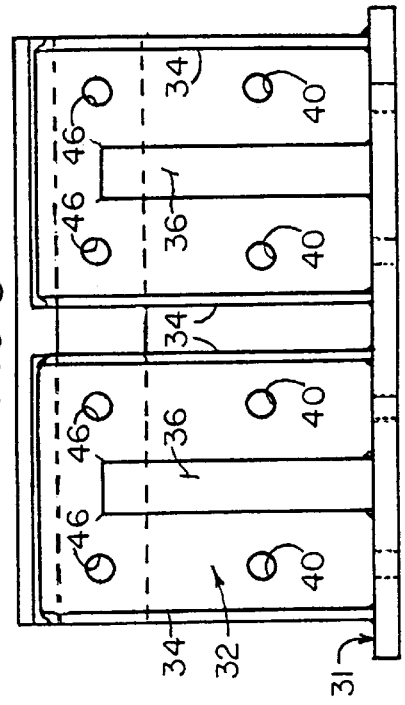
FIG.6
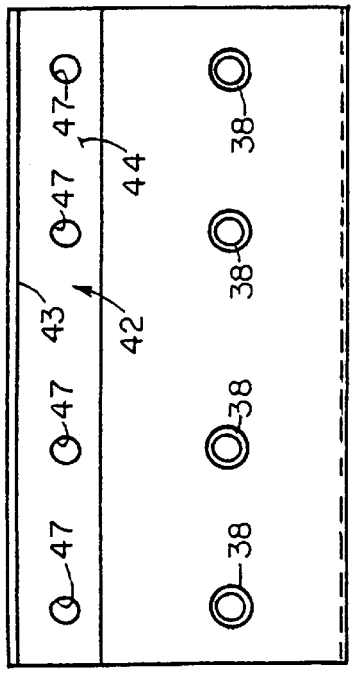
FIG.8
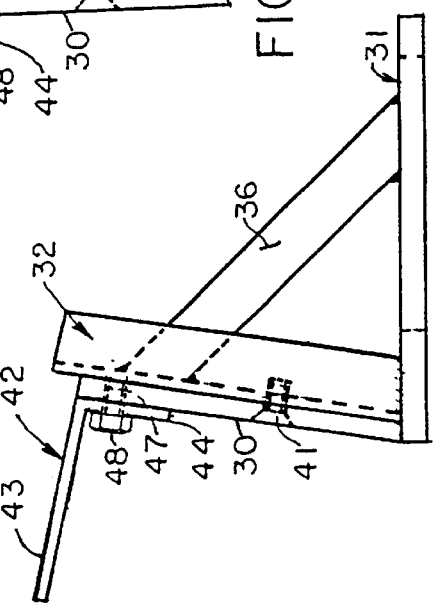
FIG.9
FIG.7

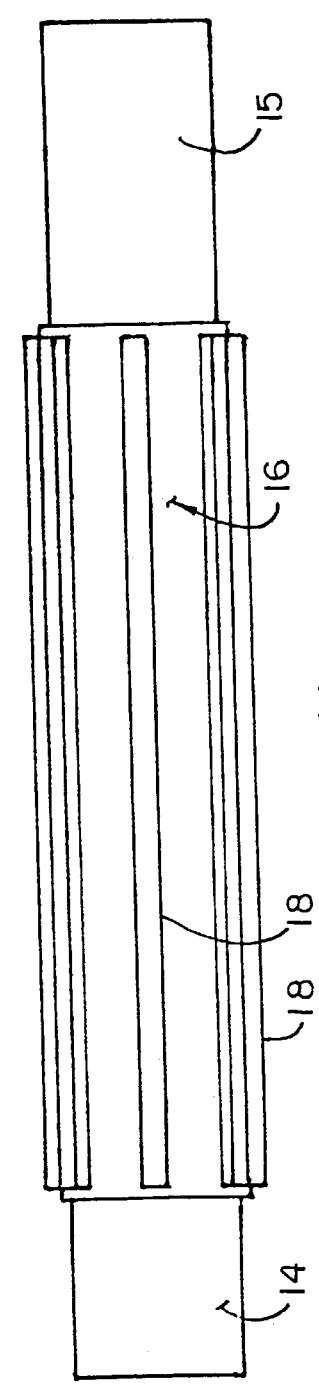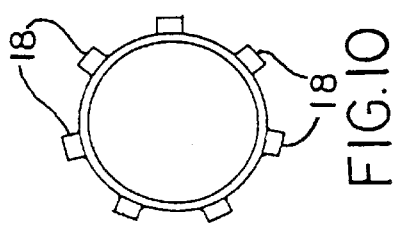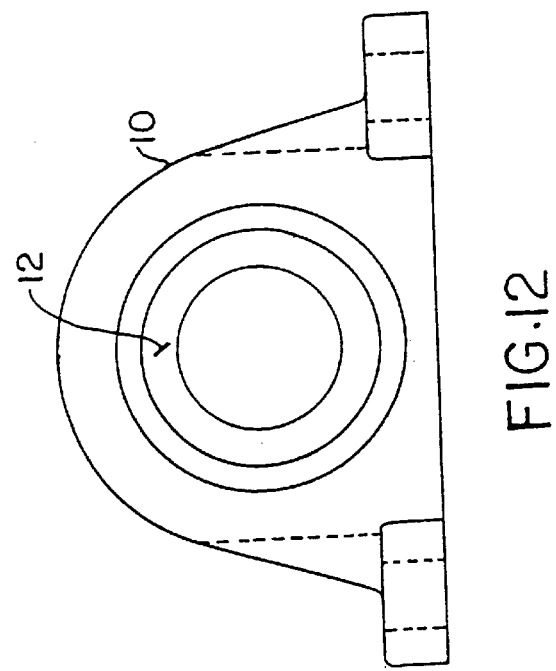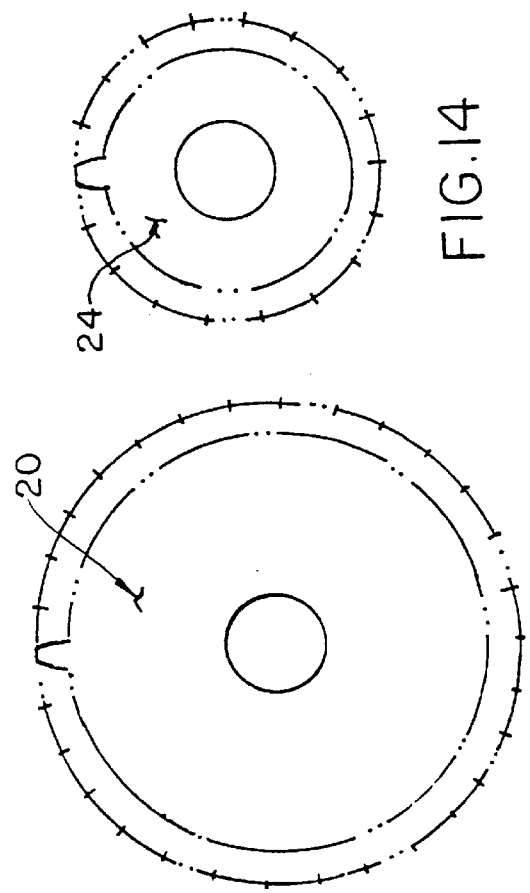

NUT CRACKING MACHINE

BACKGROUND OF THE INVENTION

The machine of this invention is particularly useful for cracking black walnuts, but it is also useful for cracking other types of hard-shelled nuts. It is especially useful to relatively small scale nut growers, because it is inexpensive, but rugged and effective.

The problem of cracking and extracting the meat from a large number of hard-shelled nuts, particularly black walnuts and hickory nuts, has vexed growers and users of nuts, and has resulted in numerous patents directed to machines for cracking nuts. These patented machines have been of three or four main sorts. One approach, exemplified by U.S. Pat. Nos. 4,218,968 and 5,115,733 relies upon rotating plates which are either on parallel axes and biased toward one another ('968) or upon making one plate slightly skewed toward the other so that when a nut is introduced between the plates, it can roll until it is compressed between the plates to crack it. Another has been the use of a plurality of wheels the perimeters of which form a small opening through which nuts pass, being cracked in the process, as exemplified by U.S. Pat. No. 4,073,032. Yet another approach has been the use of what is essentially a jaw crusher, as exemplified by U.S. Pat. No. 5,505,123. Variations of these approaches are illustrated by U.S. Pat. Nos. 4,441,414 and 5,247,879.

Most of these prior art patents are directed to shelling such nuts as pecans, which pose different problems from black walnuts, for example. Because black walnut shells are desired as abrasives, and because the meat of a black walnut is difficult to extract, it is necessary and desirable to fragment the shells to a greater degree than would be desirable for pecans or English walnuts, for example. However, the machine of this invention can be adjusted to accommodate nuts such as English walnuts, hazelnuts or pecans.

One of the objects of this invention is to provide a nut cracking machine that is rugged, dependable, relatively simple as compared with prior art machines, and effective to crack and permit the extraction of the meat from hard-shelled nuts in quantity.

Other objects will become apparent to those skilled in the art in the light of the following description and accompanying drawings.

BRIEF SUMMARY OF THE INVENTION

In accordance with this invention, generally stated, a nut cracking machine is provided that comprises a cylinder mounted in bearings for rotation about a long axis of the cylinder. The cylinder has projections extending radially from its cylindrical surface. The cylinder is mounted at a predetermined distance from an anvil plate member. The cylinder is power rotated in a direction to direct an upper part of the cylinder toward the anvil plate member. The anvil plate member is slanted from the top of the plate toward its bottom in a direction toward the cylinder. A feed hopper for receiving nuts and directing the nuts onto the cylinder is provided. In the preferred embodiment, the hopper includes a guide baffle adjacent a bottom opening of the hopper and above the cylinder for directing the nuts onto the cylinder and inhibiting upward projection of the nuts into the hopper. An overhang attached to the anvil plate projects toward the hopper and above the guide baffle and cylinder a sufficient distance to clear nuts leaving the hopper and going over the top of the cylinder. In the preferred embodiment, also, the projections on the cylinder take the form of uninterrupted, longitudinally extending ribs or bars, which pull the nuts toward the anvil plate and aid in the breaking up of the nuts.

BRIEF DESCRIPTION OF THE SEVERAL VIEWS OF THE DRAWINGS

In the drawing, FIG. 1 is a view in front elevation of one embodiment of machine of this invention;

FIG. 2 is a view in front elevation of the machine, with an anvil plate assembly removed;

FIG. 3 is a view in side elevation as viewed from left to right of FIGS. 1 and 2;

FIG. 4 is a view in side elevation as viewed from right to left in FIGS. 1 and 2;

FIG. 5 is an enlarged detail top plan view of an anvil plate assembly;

FIG. 6 is a view in front elevation of the anvil plate assembly of FIG. 5;

FIG. 7 is a view in side elevation of the anvil plate assembly of FIGS. 5 and 6;

FIG. 8 is a view in front elevation as viewed from left to right in FIG. 7 of an anvil plate without bolts;

FIG. 9 is a view in side elevation of the anvil plate and an overhang before the anvil plate is mounted on a backing plate;

FIG. 10 is a view in end elevation of a breaking cylinder of this embodiment;

FIG. 11 is a view in side elevation of the breaking cylinder of FIG. 10, with shafts extending from each end;

FIG. 12 is a view in front elevation of a pillow block in which a shaft of FIG. 11 is journalled;

FIG. 13 is a view in front elevation, with gear teeth shown schematically, of a driven sprocket, on a reduced scale;

FIG. 14 is a view in front elevation, with gear teeth shown schematically, of a driving sprocket, on a reduced scale;

DETAILED DESCRIPTION OF THE PREFERRED EMBODIMENT

Figure 15:
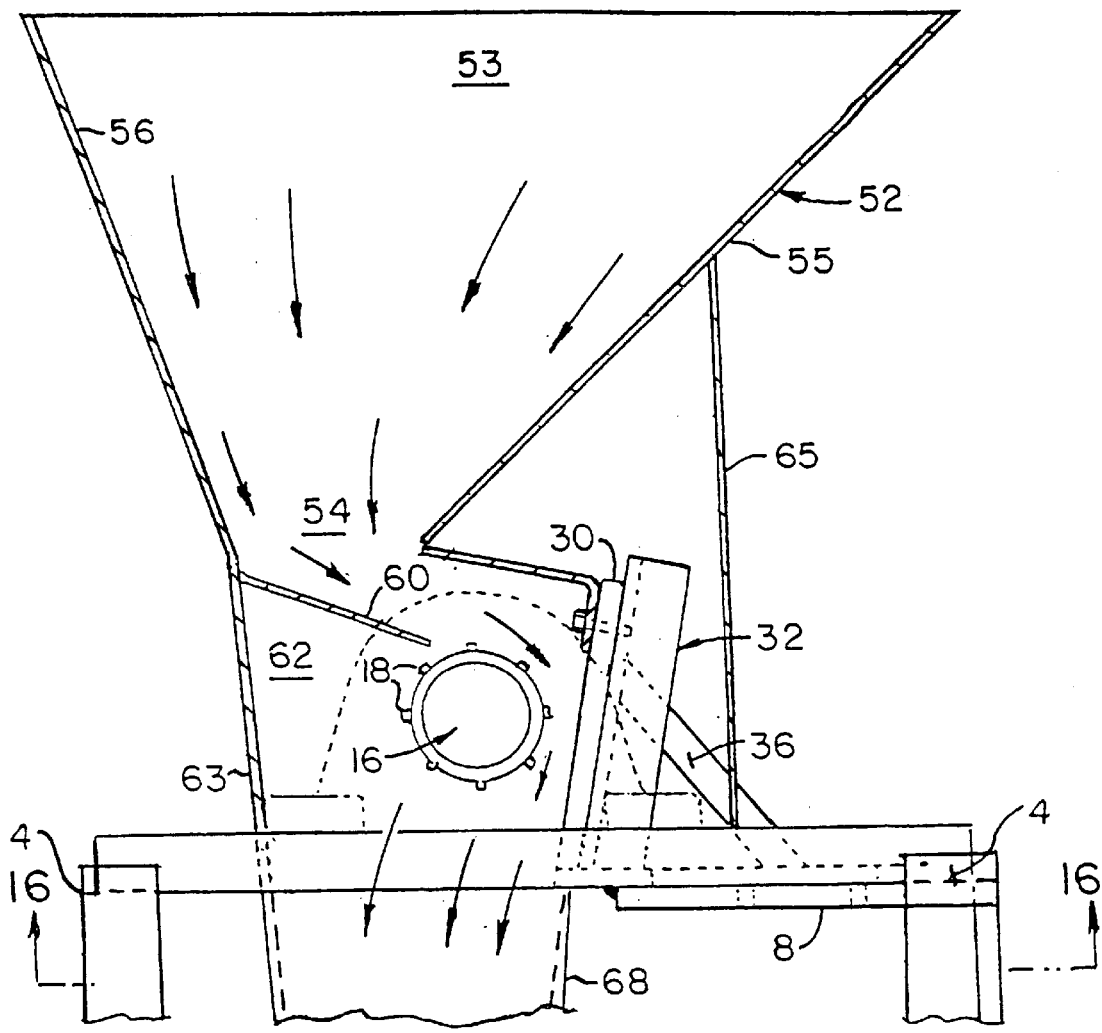
FIG. 15 is a fragmentary view in side elevation, partly broken away, of the machine shown in FIGS. 1 through 4.
Figure 16:
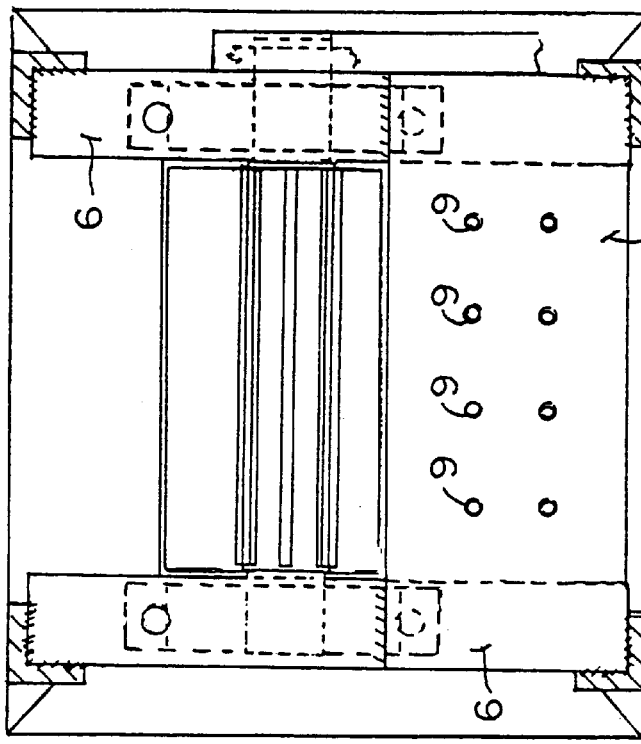
FIG. 16 is a sectional view taken along the line 16—16 of FIG. 15.
Figure 17:
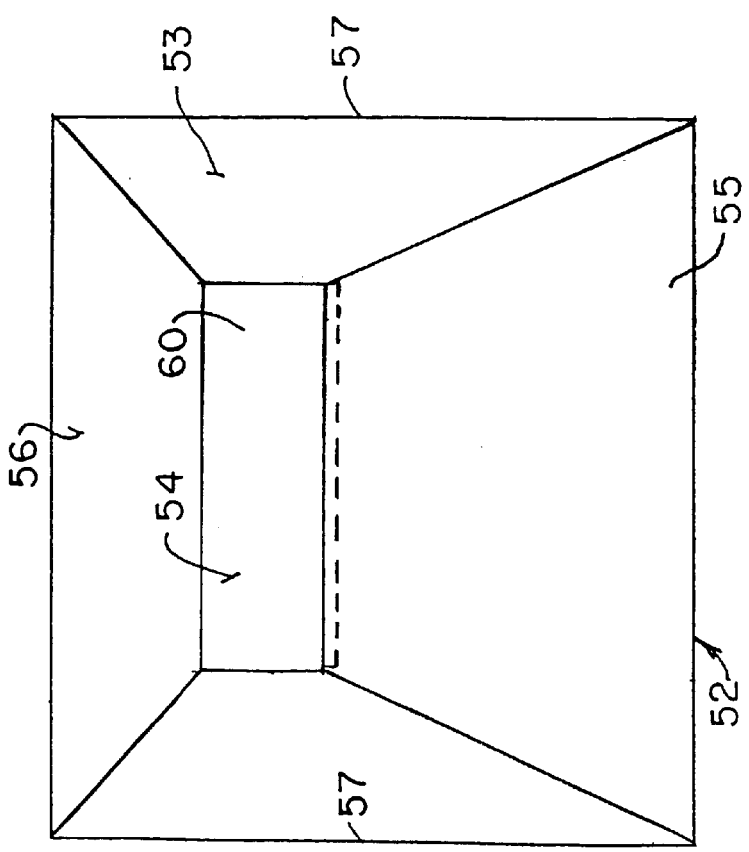
FIG. 17 is a top plan view of a hopper of the machine.

In the drawing, reference numeral 1 indicates an assembled machine of this invention. The machine 1 includes a stand 3, with legs 4 in the form of heavy angle irons welded at their tops to heavy solid side bars 6, and, in this embodiment, provided with casters 7 at their bottoms. A support plate 8 of heavy steel, is welded to and extends between the side bars 6. The support plate 8 has internally threaded bolt holes 9.

Pillow blocks 10, with heavy duty anti-friction bearings 12, are bolted to upper surfaces of the side bars 6, as shown particularly in FIG. 3.

A cylindrical breaker roll 16 has a short stub shaft 14 projecting from one end, journalled in the bearing 12 of a pillow block 10, and a somewhat longer stub shaft 15 on its other end, journalled in the bearing 12 of a pillow block 10 on the other end of the cylinder, and projecting beyond the pillow block sufficiently to receive a driven sprocket 20, keyed or otherwise securely mounted on the shaft 15.

The breaker roll 16 is, in this embodiment, provided with projections in the form of uninterrupted lengthwise extending ribs 18, welded or otherwise secured to the outer surface of the cylinder between the shafts 14 and 15. In this embodiment, the cylinder and its shafts are one piece, solid steel. The ribs can be made integral with the cylinder, or, as in the present embodiment, welded to the cylinder. The latter has the advantage that the ribs can be made of a more abrasive-resistant metal than the cylinder itself.

A motor with a gear box 22 shown somewhat diagrammatically in FIGS. 1–3, is mounted to the stand. The gear box has a shaft on which a drive sprocket 24 is mounted. The drive sprocket 24 is aligned with the driven sprocket 20 and a drive chain 26 extends between them.

In the present embodiment, the position of the cylinder roll 16 is fixed.

A breaker plate or anvil plate 30 is, in the embodiment shown, mounted by means of counter-sunk headed bolts 41, to a backing plate 32 in the form of heavy channels with flanges 34, welded to a base plate 31. Braces 36, welded at one end to the base plate 31 and at the other end to a web of the backing plate 32, serve to reinforce the backing plate against movement with respect to the base plate. The anvil plate itself has counter-sunk bolt holes 38 aligned with internally threaded holes 40 in the backing plate to receive the bolts 41, and bolt holes 45, aligned with internally threaded bolt receiving holes 46 in the backing plate 32.

An overhang 42 is in the form of an angle iron with a wide leg 43 extending toward the breaker cylinder and a relatively narrow leg 44. Bolt holes 47 through the leg 44, are aligned with the bolt holes 45 in the anvil plate and the internally threaded holes 46 in the backing plate to receive bolts 48 by which the overhang 42 is bolted to the backing plate.

Slots 49 in the base plate 31 are aligned with the bolt holes 9 in the support plate 8, to receive clamp bolts, not here shown, by which the anvil plate 30 is fixed in any desired spaced position from the breaker roll 16 within the limits of the slot length.

As can be seen from FIGS. 7 and 15, the anvil plate 30 slopes away from the cylinder 16 at an acute angle from the vertical, in the direction from the base plate to the upper end of the anvil plate.

A hopper 52 has a mouth 53 and a lower open end 54, all defined by a sharply sloping front wall 55, an oppositely sloping back wall 56, and side walls 57, as shown in FIGS. 1 through 4 and 15 as is apparent from FIG. 15, the mouth 53 is offset away from the space between the cylinder 16 and the anvil plate 30 to a place behind the cylinder. At its lower open end, the hopper has a baffle 60 under and spaced from the mouth 53, sloping from the back wall 56 downwardly toward the cylinder 16. The baffle 60 serves both to direct nuts from the hopper onto the upper side of the cylinder, and to inhibit the throwing of cracked nuts back into the hopper. A cracking chamber 62 is defined by a back wall 63, side walls 64, the baffle 60, the overhang 42 and the anvil plate 30.

The entire hopper assembly, including the cracking chamber, is supported and mounted to the stand by a support cowling 65 welded at its upper end to the side walls 57 of the hopper, and provided at its bottom edges with outwardly turned feet through which it is bolted to the side bars 6.

A discharge chute 68 extends downwardly from the cracking chamber 62 to any distance that is desired.

In operation, the motor 22 is started, to rotate the breaker cylinder 16, husked nuts are put into the hopper, where they are directed by the plate 60 to the upper side of the cylinder from which they are urged by the ribs 18 to the space between the cylinder and the anvil plate 30, and cracked into pieces, passing through the passage between the cylinder and the plate, and through the chute 68 into any suitable container placed below the chute. In the case of black walnuts, a large proportion of the nut meats are freed from the shell, making it unnecessary to pick them from the shell by hand.

Merely by way of illustration, it has been found that the angle from the vertical of the anvil plate 30, for black walnuts, is optimally 12 degrees (78 degrees from the horizontal) and the distance between the cylinder and the anvil plate at its closest, between ½ and ¾ of an inch. For hickory nuts, for example, the distance is preferably to ¼ to 5/16 of an inch, and for butternuts, between ¾ and 1 inch. The 12 degree angle is satisfactory for all of these nuts, but it is not absolutely critical. The diameter of the shafts 14 and 15 in the embodiment shown, is 2 3/16 inches, and the pillow blocks are sized accordingly. The diameter of the cylinder between the shafts is 2⅜ inches, and to the outer edges of the ribs, 2 11/16 inches. The ribbed portion of the cylinder is 12 inches long. With a motor speed of 1725 rpm, and a gear box output of 140 rpm, the drive sprocket 24 with 18 teeth and the driven socket with 30 teeth, the cylinder is rotated at 84 rpm. The bars making up the ribs in this embodiment are 5/16 inches square in transverse cross-section, and 8 in number, evenly spaced. With a one horsepower AC motor, the machine can readily crack 6 to 10 pounds of black walnuts a minute.

Numerous variations, within the scope of the appended claims, will occur to those skilled in the art in the light of the foregoing disclosure. Merely by way of example, the size of the cylinder can be varied, depending upon the type of nut and volume of nuts to be cracked. More or fewer ribs can be provided, extending less or more than 5/16 of an inch. The ribs can be set into channels in the cylinder, or dovetailed, sliding into mortises in the cylinder, or otherwise be secured to the cylinder. The projections from the cylinder can take the form of pegs, in staggered rows, or interrupted ribs. The diameter of the cylinder can be varied, as well as the diameter of the shafts. The outer surface of the cylinder can be polygonal, providing flats to which bars can be welded. Various types of motors and gear boxes can be used. The drive of the cylinder can be a direct gear drive from the gear box, instead of a chain drive. Any other power drive can be used, as, for example, a belt drive, particularly for a bank of machines, or an internal combustion engine, where electricity is not available. As has been indicated, an angle of 12 degrees from the vertical has been found particularly effective. However, the angle of the anvil plate 30 with respect to the cylinder can be varied, depending upon the type of nut and speed of rotation of the cylinder, as well as the projection of the ribs. The face of the anvil plate can be curved, if desired, although it complicates the construction of the anvil plate assembly. Although the backing plate is shown as being made in two parts, a single channel, with or without reinforcing ribs, or a heavy single plate, can be used. Gussets may be used instead of the braces, to reinforce the backing plate. The cylinder can be driven at different speeds. A single shaft, cantilevered, can support the cylinder, with spaced bearings, but such a construction requires a heavy shaft to avoid springing of the shaft and cylinder. As shown in FIG. 3, a square or hexagonal boss can be provided on the end of the shorter of the shafts, to accommodate a wrench, to enable the cylinder to be turned manually in the opposite direction, in case of a jam, when the motor has been turned off. These variations are merely illustrative.

What is claimed is:

1. A nut cracking machine composing a breaking cylinder mounted in bearings for rotation about a long axis of the cylinder, said cylinder having projections extending radially from the cylindrical surface of said cylinder, a plate assembly including an anvil plate member mounted to be held at a fixed predetermined distance from said breaking cylinder when the machine is in operation to define a space between said cylinder and said anvil plate; power means for rotating the cylinder, and a feed hopper for receiving nuts and directing the nuts onto said cylinder, said feed hopper having a bottom opening mouth offset completely from said space, said cylinder rotating in a direction to direct an upper part of the cylinder toward said anvil plate member.

2. The machine of claim 1 wherein the axis of rotation of said cylinder is substantially horizontal and said anvil plate extends in a direction from top to bottom to at an acute angle toward said cylinder.

3. The machine of claim 2 wherein the angle is on the order of 12 degrees.

4. The machine of claim 1 wherein the projections extending from said cylinder are uninterrupted ribs extending lengthwise of the cylinder parallel to said axis.

5. The machine of claim 1 including a guide baffle spaced below the mouth of said hopper and above said cylinder for directing said nuts onto said cylinder toward said anvil plate and inhibiting upward projection of said nuts into said hopper.

6. The machine of claim 1 including an overhang attached to said plate assembly, projecting toward said hopper, spaced above said guide baffle and cylinder a sufficient distance to clear nuts leaving said hopper and going over the top of said cylinder.

7. The machine of claim 1 wherein said plate assembly comprises an anvil plate support including a base plate and means for permitting selective moving of said base plate, hence said anvil plate member, toward and away from said cylinder, and for anchoring said base plate, hence said anvil plate member, in a preselected place relative to said cylinder, said cylinder being fixed against translation with respect to said anvil plate.

8. The machine of claim 7 wherein the means for permitting selective moving of said base plate include internally threaded holes in a support plate underlying said base plate to receive bolts extending through slots in said base plate said bolt holes extending in lines perpendicularly to the axis of rotation of the cylinder.

9. The machine of claim 7 wherein said plate assembly includes an anvil plate backing member with bolt-receiving holes placed complementarily to bolt holes in the anvil plate, and bolts removably mounted in said holes, whereby the anvil plate can readily be removed and replaced.

10. The machine of claim 1 wherein the cylinder is a solid steel shape with smooth stub shaft ends journalled in pillow blocks at either end.

11. A nut cracking machine comprising a breaking cylinder mounted in bearings for rotation about a long axis of the cylinder, the axis of rotation of said cylinder being substantially horizontal, projections extending radially from said cylinder in the form of uninterrupted ribs extending lengthwise of the cylinder parallel to said axis; a plate assembly including an anvil plate member mounted to be held at a fixed predetermined distance from said cylinder when the machine is in operation to define a space between said cylinder and said anvil plate member, said anvil plate member extending in a direction from bottom to top at an angle on the order of 12 degrees from said cylinder; and a feed hopper having a mouth offset from said space, and a guide baffle spaced below the mouth of said hopper for directing said nuts onto said cylinder and inhibiting upward projection of said nuts into said hopper.

12. The machine of claim 10 wherein said plate assembly comprises an anvil plate support including a base plate and means for permitting selective moving of said base plate, hence said anvil plate member, toward and away from said cylinder, and for anchoring said base plate, hence said anvil plate member, in a preselected place relative to said cylinder.

13. The machine of claim 11 including a support structure wherein the means for permitting selectively moving said base plate include threaded members extending through slots in said base plate and into complementarily arranged holes in a fixed supporting plate, said slots and holes extending perpendicularly to the axis of rotation of the cylinder.

14. The machine of claim 1 wherein the cylinder is rotated at a rate on the order of 84 RPM.

15. A nut cracking machine comprising a breaking cylinder having at least one stub shaft projecting from an end of said roll and mounted in bearings for rotation about a long axis of said cylinder, power means connected to rotate said roll, and an anvil plate mounted a predetermined distance from said roll, said anvil plate sloping toward said roll in a direction from a top edge toward a bottom edge of said anvil plate.

16. The machine of claim 11 wherein said plate assembly includes an overhang attached to said plate assembly, projecting toward said hopper, spaced above said guide baffle and cylinder a distance sufficient to clear nuts leaving said hopper and going over the top of said cylinder.

* * * * *

UNITED STATES PATENT AND TRADEMARK OFFICE
CERTIFICATE OF CORRECTION

| | |
|---|---|
| PATENT NO. | : 6,209,448 B1 |
| DATED | : April 3, 2001 |
| INVENTOR(S) | : William G. Hagen |

Page 1 of 1

It is certified that error appears in the above-identified patent and that said Letters Patent is hereby corrected as shown below:

<u>Column 4,</u>
Line 64, replace "composing" with -- comprising --

Signed and Sealed this

First Day of January, 2002

Attest:

JAMES E. ROGAN
*Attesting Officer*     *Director of the United States Patent and Trademark Office*